US008693951B2

(12) United States Patent
Yang

(10) Patent No.: US 8,693,951 B2
(45) Date of Patent: Apr. 8, 2014

(54) WIRELESS AUDIO FREQUENCY PLAYING APPARATUS AND WIRELESS PLAYING SYSTEM USING THE SAME

(75) Inventor: Chao-Tung Yang, Hsinchu (TW)

(73) Assignee: KeyStone Semiconductor Corp., Hsinchu (TW)

( * ) Notice: Subject to any disclaimer, the term of this patent is extended or adjusted under 35 U.S.C. 154(b) by 455 days.

(21) Appl. No.: 13/167,697

(22) Filed: Jun. 24, 2011

(65) Prior Publication Data

US 2012/0224698 A1 Sep. 6, 2012

(30) Foreign Application Priority Data

Mar. 3, 2011 (TW) .............................. 100203695 U

(51) Int. Cl.
*H04B 7/00* (2006.01)
(52) U.S. Cl.
USPC ................................ 455/41.2; 381/1; 369/85
(58) Field of Classification Search
USPC .............................................. 455/41.2; 381/1
See application file for complete search history.

(56) References Cited

U.S. PATENT DOCUMENTS

| | | | | |
|---|---|---|---|---|
| 5,239,585 A * | 8/1993 | Restle | ................................ | 381/7 |
| 5,465,396 A * | 11/1995 | Hunsinger et al. | .............. | 455/61 |
| 5,757,854 A * | 5/1998 | Hunsinger et al. | ............. | 375/260 |
| 5,832,024 A * | 11/1998 | Schotz et al. | .................. | 375/134 |
| 5,850,415 A * | 12/1998 | Hunsinger et al. | ............. | 375/216 |
| 5,912,917 A * | 6/1999 | Engelbrecht et al. | ......... | 375/131 |
| 5,929,896 A * | 7/1999 | Goodman et al. | ......... | 348/14.12 |
| 5,946,343 A * | 8/1999 | Schotz et al. | .................. | 375/141 |
| 5,949,796 A * | 9/1999 | Kumar | ........................... | 370/529 |
| 6,246,698 B1 * | 6/2001 | Kumar | ........................... | 370/487 |
| 6,510,175 B1 * | 1/2003 | Hunsinger et al. | ............. | 375/216 |
| 6,658,115 B1 * | 12/2003 | Lam | ................................... | 381/2 |
| 6,845,230 B2 * | 1/2005 | Syed | ............................ | 455/3.02 |
| 7,046,694 B2 * | 5/2006 | Kumar | ........................... | 370/487 |
| 7,120,463 B2 * | 10/2006 | Mathews | ...................... | 455/557 |
| 7,266,390 B2 * | 9/2007 | Mathews | ................... | 455/556.1 |
| 7,805,168 B2 * | 9/2010 | Wang | ............................ | 455/566 |
| 7,904,110 B2 * | 3/2011 | Young et al. | ............... | 455/552.1 |
| 8,050,203 B2 * | 11/2011 | Jacobsen et al. | .............. | 370/310 |
| 8,155,342 B2 * | 4/2012 | Marlowe | .......................... | 381/86 |
| 8,554,133 B1 * | 10/2013 | Feldman et al. | .............. | 455/3.06 |
| 2002/0151271 A1 * | 10/2002 | Tatsuji et al. | ................. | 455/3.05 |
| 2003/0179889 A1 * | 9/2003 | Pivinski | ........................... | 381/79 |
| 2003/0236075 A1 * | 12/2003 | Johnson et al. | .................. | 455/99 |
| 2004/0223622 A1 * | 11/2004 | Lindemann et al. | ............ | 381/79 |
| 2005/0208913 A1 * | 9/2005 | Raisinghani et al. | ....... | 455/161.2 |
| 2005/0245191 A1 * | 11/2005 | Falcon | ............................ | 455/3.06 |
| 2005/0261033 A1 * | 11/2005 | Wang | ............................ | 455/566 |
| 2006/0234659 A1 * | 10/2006 | Sakamoto | .................. | 455/151.1 |

(Continued)

*Primary Examiner* — Hai V Nguyen
(74) *Attorney, Agent, or Firm* — Jianq Chyun IP Office

(57) ABSTRACT

A wireless audio frequency playing apparatus and a wireless playing system using the same are provided. The wireless playing system includes a wireless remote controller and the wireless audio frequency playing apparatus. The wireless audio frequency playing apparatus is operated under control of the wireless remote controller. The wireless audio frequency playing apparatus includes a digital broadcasting chip, an amplifier, and a speaker. Two-way communication is processed between the digital broadcasting chip and the wireless remote controller. A content of the digital radio broadcasting program includes audio, text, images, binary data or video. The wireless audio frequency playing apparatus can play digital radio broadcasting program. The wireless audio frequency playing apparatus can independently process the digital audio broadcasting signal, and the wireless remote controller can control channel selection and a sound volume of the wireless audio frequency playing apparatus through a wireless manner.

17 Claims, 4 Drawing Sheets

(56) References Cited

U.S. PATENT DOCUMENTS

| | | |
|---|---|---|
| 2007/0015486 A1* | 1/2007 | Marlowe .................... 455/345 |
| 2007/0021148 A1* | 1/2007 | Mahini ........................ 455/557 |
| 2007/0041589 A1* | 2/2007 | Patel et al. .................. 381/73.1 |
| 2007/0056000 A1* | 3/2007 | Pantalone et al. ............... 725/90 |
| 2007/0250872 A1* | 10/2007 | Dua ............................... 725/81 |
| 2007/0293183 A1* | 12/2007 | Marlowe ...................... 455/345 |
| 2008/0130912 A1* | 6/2008 | Marlowe ........................ 381/86 |
| 2008/0240058 A1* | 10/2008 | Hansen et al. ................ 370/338 |
| 2008/0246850 A1* | 10/2008 | Marlowe .................... 348/222.1 |
| 2009/0060453 A1* | 3/2009 | Kellogg ........................... 386/95 |
| 2010/0316027 A1* | 12/2010 | Rick et al. ..................... 370/336 |
| 2010/0329491 A1* | 12/2010 | Johansen ...................... 381/315 |
| 2011/0202270 A1* | 8/2011 | Sharma et al. ................ 701/201 |
| 2011/0213681 A1* | 9/2011 | Shahid ......................... 705/27.1 |
| 2011/0270428 A1* | 11/2011 | Tam ............................... 700/94 |
| 2012/0131098 A1* | 5/2012 | Wood et al. ................... 709/203 |
| 2012/0210268 A1* | 8/2012 | Hilbrink et al. ............... 715/773 |
| 2013/0016008 A1* | 1/2013 | Walley et al. ............ 342/357.29 |

* cited by examiner

WIRELESS AUDIO FREQUENCY PLAYING APPARATUS AND WIRELESS PLAYING SYSTEM USING THE SAME

CROSS-REFERENCE TO RELATED APPLICATION

This application claims the priority benefit of Taiwan application serial no. 100203695, filed Mar. 3, 2011. The entirety of the above-mentioned patent application is hereby incorporated by reference herein and made a part of this specification.

BACKGROUND

1. Field of the Invention

The invention relates to a playing apparatus and a playing system. Particularly, the invention relates to a wireless audio frequency playing apparatus capable of playing digital broadcasting programs and a wireless playing system using the same.

2. Description of Related Art

Regarding a general handheld device capable of connecting an external earphone, for example, a mobile phone or a mobile Internet device, if a digital broadcasting chip is not built in the handheld device, a user cannot listen to digital radio programs. Moreover, regarding a Bluetooth earphone of the mobile phone, the existing technique can only provide a single-channel sound other than a high-quality stereo sound, and two-way communication cannot be implemented between the Bluetooth earphone and the mobile phone.

A commonly used earphone has a connection line, which is used for connecting a playing device. The user may feel inconvenient when the connection line is excessively long or excessively short, and the too long connection line is liable to have a winding problem.

Moreover, in order to increase functions of the handheld device, according to the existing technique, a dongle is used to increase extra functions of the handheld device. Referring to FIG. 1, FIG. 1 is a diagram illustrating a handheld device and a dongle having a radio function. The dongle has a screen and keys. When the dongle having the radio function is inserted to a universal serial bus (USB) connection port of the handheld device, the dongle can extract power from the handheld device to serve as electric energy required by the dongle. However, the user cannot control the dongle through operations of the handheld device, but has to control the dongle through the keys thereon, wherein the screen on the dongle displays a station selecting state. Moreover, the dongle method has a shortage that the dongle is easy to break up the connection port of the handheld device, and cannot protect the handheld device, which may also lead to a huge size of the device. Moreover, since the dongle does not have a battery, it additionally consumes the electric energy of the handheld device. In other words, the electric energy of the handheld device is consumed faster than usual. Therefore, the dongle is still inconvenient in utilization.

SUMMARY OF THE INVENTION

Accordingly, the invention is directed to a wireless audio frequency playing apparatus and a wireless playing system using the same, the wireless audio frequency playing apparatus can resolve problems mentioned in the related art to facilitate a user listening to digital radio broadcasting programs.

An embodiment of the invention provides a wireless audio frequency playing apparatus, where a wireless remote controller is used to control operations thereof. The wireless audio frequency playing apparatus includes a digital broadcasting chip, an amplifier, and a speaker. Two-way communication is processed between the digital broadcasting chip and the wireless remote controller. The digital broadcasting chip receives a digital audio broadcasting signal, and transfers the digital audio broadcasting signal into a stereo high fidelity signal. The amplifier is coupled to the digital broadcasting chip and amplifies the stereo high fidelity signal into a stereo audio frequency signal. The speaker is coupled to the amplifier and plays the stereo audio frequency signal.

An embodiment of the invention provides a wireless playing system including a wireless remote controller and a wireless audio frequency playing apparatus. The wireless remote controller includes a first radio frequency (RF) transceiver. The wireless audio frequency playing apparatus is operated under control of the wireless remote controller. The wireless audio frequency playing apparatus includes a digital broadcasting chip, an amplifier, and a speaker. Two-way communication is processed between the digital broadcasting chip and the wireless remote controller. The digital broadcasting chip receives a digital audio broadcasting signal, and transfers the digital audio broadcasting signal into a stereo high fidelity signal. The amplifier is coupled to the digital broadcasting chip and amplifies the stereo high fidelity signal into a stereo audio frequency signal. The speaker is coupled to the amplifier and plays the stereo audio frequency signal.

In an embodiment of the invention, the digital broadcasting chip receives a first Bluetooth protocol signal or a first Wi-Fi protocol signal from the wireless remote controller, and transmits a second Bluetooth protocol signal or a second Wi-Fi protocol signal to the wireless remote controller. A transfer content of two-way communication is related to audio, text, images, binary data or video.

In an embodiment of the invention, the digital broadcasting chip includes a RF transceiver, a demodulator/decompressor and a stereo digital to analog converter (DAC). The RF transceiver receives a first Bluetooth protocol signal or a first Wi-Fi protocol signal from the wireless remote controller, and transmits a second Bluetooth protocol signal or a second Wi-Fi protocol signal to the wireless remote controller, and transfers the digital audio broadcasting signal into an intermediate frequency (IF) signal. The demodulator/decompressor is coupled to the RF transceiver for receiving the IF signal, and converts the IF signal into a digital channel signal under control of the wireless remote controller. The stereo DAC is coupled to the demodulator/decompressor for converting the digital channel signal into the stereo high fidelity signal.

In an embodiment of the invention, the demodulator/decompressor adjusts a digital broadcasting channel according to the first Bluetooth protocol signal or the first Wi-Fi protocol signal, so as to convert the digital channel signal.

In an embodiment of the invention, the demodulator/decompressor adjusts an amplification of the amplifier according to the first Bluetooth protocol signal or the first Wi-Fi protocol signal.

In an embodiment of the invention, the wireless audio frequency playing apparatus is a wireless earphone or a wireless portable speaker device.

In an embodiment of the invention, the wireless audio frequency playing apparatus includes a first power supply, and the first power supply is electrically connected to the digital broadcasting chip and the amplifier, and the first power supply is a rechargeable battery or a storage battery.

In an embodiment of the invention, a power supply of the wireless audio frequency playing apparatus is an external type power supply.

In an embodiment of the invention, the wireless remote controller is a mobile phone or a mobile Internet device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
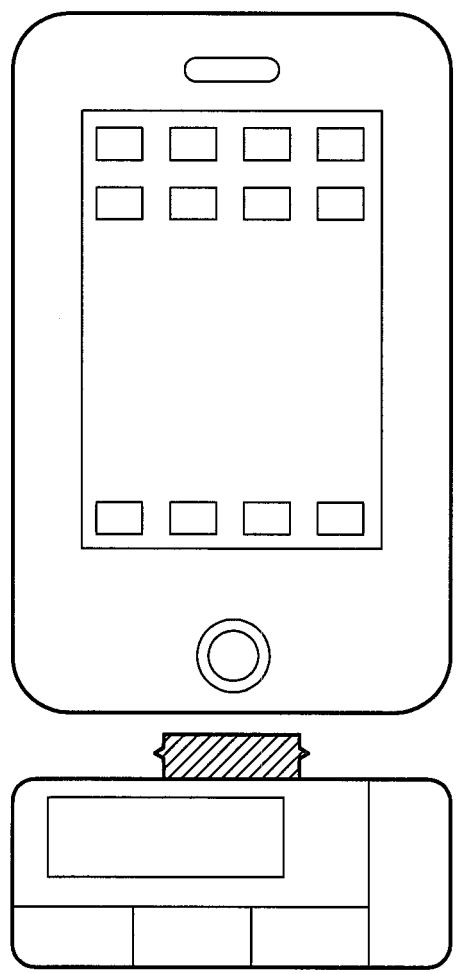
FIG. 1 is a diagram illustrating a dongle having a radio function.

Embodiments are provided below with reference of drawings to fully describe the technique of the present invention, though the invention is not limited to the provided embodiments. In order to fully convey the concept of the invention to those skilled in the art, for clarity's sake, sizes of the components in the drawings can be exaggerated.

Figure 2:
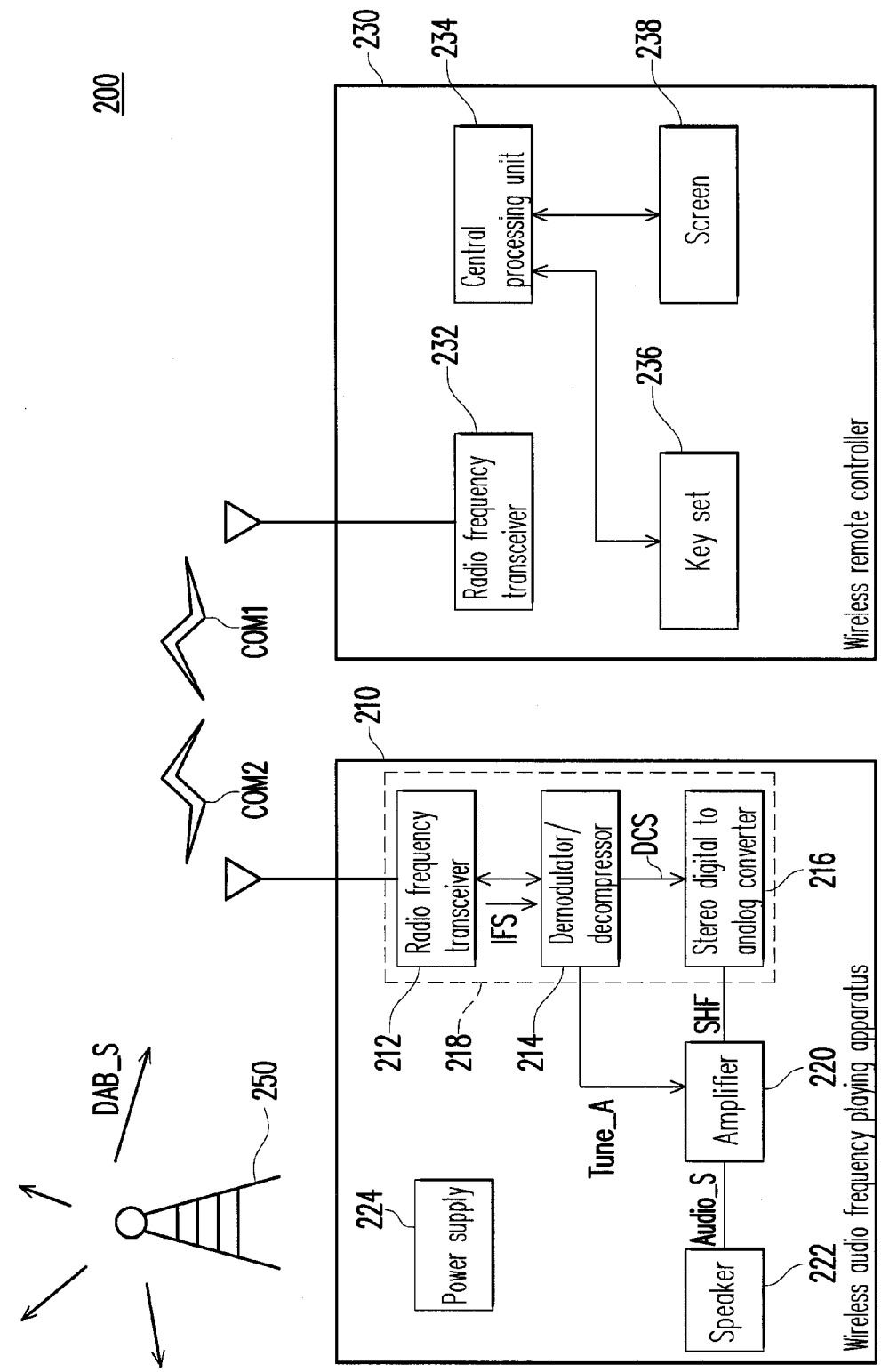
FIG. 2 is a circuit block diagram of a wireless playing system according to an embodiment of the invention.

FIG. 2 is a circuit block diagram of a wireless playing system according to an embodiment of the invention. Referring to FIG. 2, the wireless playing system 200 may include a wireless audio frequency playing apparatus 210 and a wireless remote controller 230. The wireless audio frequency playing apparatus 210 includes a digital broadcasting chip 218, an amplifier 220, and a speaker 222.

The wireless audio frequency playing apparatus 210 can be used to play digital audio broadcasting (DAB). The digital broadcasting chip 218 receives a digital audio broadcasting signal DAB_S from a digital broadcasting station 250, and transfers the digital audio broadcasting signal DAB_S into a stereo high fidelity signal SHF. The amplifier 220 is coupled between the digital broadcasting chip 218 and the speaker 222. The amplifier is used to amplify the stereo high fidelity signal SHF into a stereo audio frequency signal Audio_S. The speaker 222 plays the stereo audio frequency signal Audio_S.

Two-way communication can be processed between the digital broadcasting chip 218 and the wireless remote controller 230, where a protocol used for implementing the two-way communication can be a Bluetooth (BT) protocol or a Wi-Fi protocol, wherein a transfer content of two-way communication is related to audio, text, images, binary data or video, though the invention is not limited thereto. The wireless remote controller 230 includes a radio frequency (RF) transceiver 232. The operations of the wireless audio frequency playing apparatus 210 are controlled by the wireless remote controller 230. For example, a user can press a key set 236 in the wireless remote controller 230 to select a frequency channel or adjust a sound volume, though the control items are not limited thereto.

For example, a demodulator/decompressor 214 in the wireless audio frequency playing apparatus 210 can adjust a digital broadcasting channel according to a communication signal COM1 received from the wireless remote controller 230, or send an amplifier tuning signal Tune_A to tune an amplification of the amplifier 220 to control a magnitude of a playing sound. The communication signal COM1 can be a BT protocol signal or a Wi-Fi protocol signal, though the invention is not limited thereto.

Moreover, since the wireless audio frequency playing apparatus 210 can independently process computation of the digital audio broadcasting signal DAB_S, computation resource of a central processing unit 234 in the wireless remote controller 230 is not occupied when music of the digital radio broadcasting program is played.

A content of the digital radio broadcasting program includes audio, text, images, binary data or video. Therefore, when the wireless audio frequency playing apparatus 210 plays the digital radio broadcasting program, instant text or picture information in the digital audio broadcasting signal DAB_S (for example, an instant message, a temperature chart or a stock chart, etc., though the invention is not limited thereto) can be transmitted to the RF transceiver 232 through a communication signal COM2 transmitted by the RF transceiver 212. Then, a screen 238 of the wireless remote controller 230 can display the instant text or the picture information. The screen 238 of the wireless remote controller 230 can display an instant message, a related picture or news, so that the user can obtain information in real-time. The communication signal COM2 can be a BT protocol signal or a Wi-Fi protocol signal, and the wireless remote controller 230 can be a mobile phone or a mobile Internet device (MID), though the invention is not limited thereto. For example, the wireless remote controller 230 can be a smart phone, a personal digital assistant (PDA), a portable digital multimedia player, a flat panel computer or an e-book having a wireless communication function.

It should be noticed that the digital broadcasting chip 218 includes the RF transceiver 212, the demodulator/decompressor 214 and a stereo digital to analog converter (DAC) 216. The demodulator/decompressor 214 is coupled between the RF transceiver 212 and the stereo DAC 216. The RF transceiver 212 receives the communication signal COM1 from the wireless remote controller 230, and transmits the communication signal COM2 to the wireless remote controller 230, and converts the digital audio broadcasting signal DAB_S into an intermediate frequency (IF) signal IFS. The demodulator/decompressor 214 receives the IF signal IFS, and converts the IF signal IFS into a digital channel signal DCS under control of the wireless remote controller 230. The stereo DAC 216 converts the digital channel signal DCS into the stereo high fidelity signal SHF.

Moreover, the wireless audio frequency playing apparatus 210 further includes an independent power supply 224. The power supply 224 is electrically connected to the digital broadcasting chip 218 and the amplifier 220. The power supply 224 can be a rechargeable battery or a storage battery.

Figure 3A:
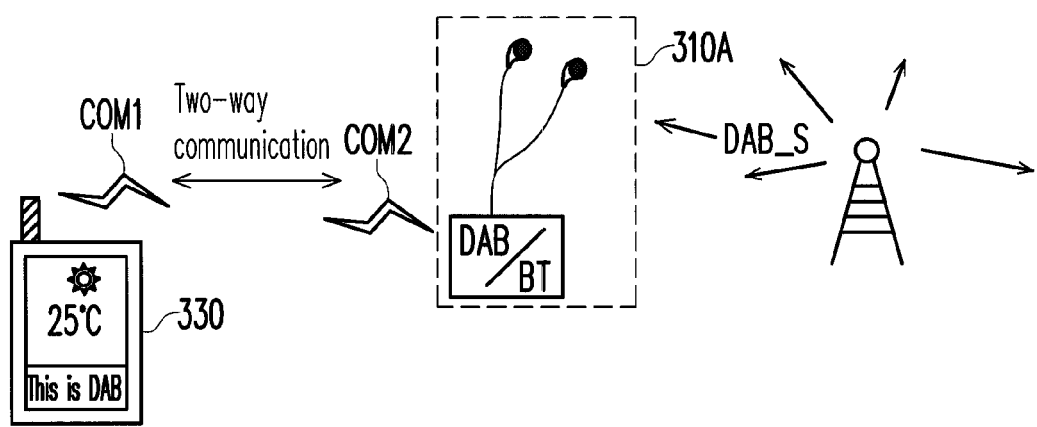
FIG. 3A and FIG. 3B are schematic diagrams of a wireless playing system 200 according to an embodiment of the invention.
Figure 3B:
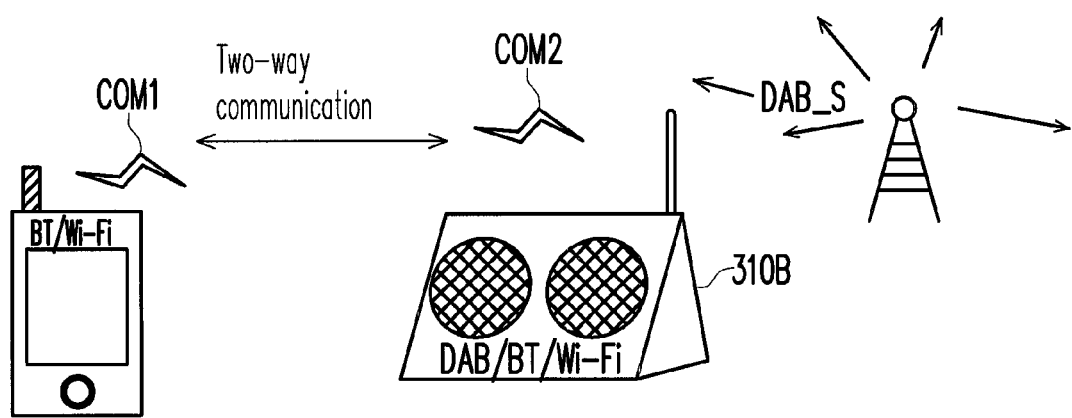

FIG. 3A and FIG. 3B are schematic diagrams of a wireless playing system 200 according to an embodiment of the invention. Referring to FIG. 3A, a wireless audio frequency playing apparatus 310A can be a wireless earphone. The wireless earphone of FIG. 3A can play stereo audio frequency signals, so that the user can enjoy better stereo sounds. Two-way communication can be implemented between the wireless earphone and a wireless remote controller 330 through the Bluetooth or the Wi-Fi communication method, so as to transmit the content of the digital radio broadcasting program. For example, a screen of the wireless remote controller 330 can display an instant text of "This is DAB", or display picture information related to an air temperature of 25° C., or display video, though the displayed content is not limited thereto. In the present embodiment, since none connection line is connected between the wireless audio frequency playing apparatus 310A and the wireless remote controller 330, after the user selects a radio channel, the wireless remote controller 330 can be directly put into pocket, so that the user's activity can be more flexible, and a winding problem of the earphone line can be avoided.

Referring to FIG. 3B, similarly, the earphone can be replaced by a large speaker. Therefore, the wireless audio frequency playing apparatus 310B can be implemented by a wireless portable speaker device, and a power supply thereof can be an external type power supply, though the invention is not limited thereto.

Although a possible pattern of the wireless audio frequency playing apparatus and the wireless playing system using the same has been described in the above embodiments, it should be understood by those skilled in the art that the design of the wireless audio frequency playing apparatus varies with manufacturers, thus, application of the present invention should not be limited to the possible pattern. In other words, the spirit of the present invention is met as long as the wireless audio frequency playing apparatus can independently process the digital audio broadcasting signal, and the wireless remote controller can control channel selection and a sound volume of the wireless audio frequency playing apparatus through a wireless manner.

The wireless audio frequency playing apparatus can play digital radio broadcasting programs and produce a stereo sound effect. The user can easily select a channel or control the sound volume through the wireless remote controller (for example, a mobile phone, an iPad, or a MID, though the invention is not limited thereto), and can view pictures broadcasted by the radio station. In this way, the user's daily life can be more convenient, and the user can effectively receive instant information.

In summary, the wireless audio frequency playing apparatus may have a dual-channel to play digital broadcasting programs, and can provide better stereo sound quality, and resolve a shortcoming of an existing Bluetooth earphone which only has a single-channel.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A wireless audio frequency playing apparatus, operated under control of a wireless remote controller, the wireless audio frequency playing apparatus comprising:
   a digital broadcasting chip, wherein two-way communication is processed between the digital broadcasting chip and the wireless remote controller, and the digital broadcasting chip receives a digital audio broadcasting signal, and transfers the digital audio broadcasting signal into a stereo high fidelity signal;
   an amplifier, coupled to the digital broadcasting chip, for amplifying the stereo high fidelity signal into a stereo audio frequency signal; and
   a speaker, coupled to the amplifier, for playing the stereo audio frequency signal.

2. The wireless audio frequency playing apparatus as claimed in claim 1, wherein the digital broadcasting chip receives a first Bluetooth protocol signal or a first Wi-Fi protocol signal from the wireless remote controller, and transmits a second Bluetooth protocol signal or a second Wi-Fi protocol signal to the wireless remote controller;
   wherein a transfer content of two-way communication is related to audio, text, images, binary data or video.

3. The wireless audio frequency playing apparatus as claimed in claim 1, wherein the digital broadcasting chip comprises:
   a radio frequency transceiver, for receiving a first Bluetooth protocol signal or a first Wi-Fi protocol signal from the wireless remote controller, and transmitting a second Bluetooth protocol signal or a second Wi-Fi protocol signal to the wireless remote controller, and transferring the digital audio broadcasting signal into an intermediate frequency signal;
   a demodulator/decompressor, coupled to the radio frequency transceiver, for receiving the intermediate frequency signal, and converting the intermediate frequency signal into a digital channel signal under control of the wireless remote controller; and
   a stereo digital to analog converter, coupled to the demodulator/decompressor, for converting the digital channel signal into the stereo high fidelity signal.

4. The wireless audio frequency playing apparatus as claimed in claim 3, wherein the demodulator/decompressor adjusts a digital broadcasting channel according to the first Bluetooth protocol signal or the first Wi-Fi protocol signal, so as to convert the digital channel signal.

5. The wireless audio frequency playing apparatus as claimed in claim 3, wherein the demodulator/decompressor adjusts an amplification of the amplifier according to the first Bluetooth protocol signal or the first Wi-Fi protocol signal.

6. The wireless audio frequency playing apparatus as claimed in claim 1, wherein the wireless audio frequency playing apparatus is a wireless earphone or a wireless portable speaker device.

7. The wireless audio frequency playing apparatus as claimed in claim 6, wherein the wireless audio frequency playing apparatus comprises a first power supply, and the first power supply is electrically connected to the digital broadcasting chip and the amplifier, and the first power supply is a rechargeable battery or a storage battery.

8. The wireless audio frequency playing apparatus as claimed in claim 1, wherein a power supply of the wireless audio frequency playing apparatus is an external type power supply.

9. A wireless playing system, comprising:
   a wireless remote controller, comprising:
      a first radio frequency transceiver; and
   a wireless audio frequency playing apparatus, operated under control of the wireless remote controller, and the wireless audio frequency playing apparatus comprising:
      a digital broadcasting chip, wherein two-way communication is processed between the digital broadcasting chip and the wireless remote controller, and the digital broadcasting chip receives a digital audio broadcasting signal, and transfers the digital audio broadcasting signal into a stereo high fidelity signal;
      an amplifier, coupled to the digital broadcasting chip, for amplifying the stereo high fidelity signal into a stereo audio frequency signal; and
      a speaker, coupled to the amplifier, for playing the stereo audio frequency signal.

10. The wireless playing system as claimed in claim 9, wherein the first radio frequency transceiver transmits a first Bluetooth protocol signal or a first Wi-Fi protocol signal to the digital broadcasting chip, and the first radio frequency transceiver receives a second Bluetooth protocol signal or a second Wi-Fi protocol signal from the digital broadcasting chip, wherein a transfer content of two-way communication is related to audio, text, images, binary data or video.

11. The wireless playing system as claimed in claim 10, wherein the digital broadcasting chip adjusts a digital broadcasting channel according to the first Bluetooth protocol signal or the first Wi-Fi protocol signal, so as to convert a digital channel signal.

12. The wireless playing system as claimed in claim 10, wherein the digital broadcasting chip adjusts an amplification of the amplifier according to the first Bluetooth protocol signal or the first Wi-Fi protocol signal.

13. The wireless playing system as claimed in claim 9, wherein the digital broadcasting chip comprises:

a second radio frequency transceiver, for receiving a first Bluetooth protocol signal or a first Wi-Fi protocol signal from the first radio frequency transceiver, and transmitting a second Bluetooth protocol signal or a second Wi-Fi protocol signal to the first radio frequency transceiver, and transferring the digital audio broadcasting signal into an intermediate frequency signal; and a demodulator/decompressor, coupled to the second radio frequency transceiver, for receiving the intermediate frequency signal, and converting the intermediate frequency signal into a digital channel signal under control of the wireless remote controller.

14. The wireless playing system as claimed in claim 9, wherein the wireless audio frequency playing apparatus is a wireless earphone or a wireless portable speaker device.

15. The wireless playing system as claimed in claim 14, wherein the wireless audio frequency playing apparatus comprises a first power supply, and the first power supply is electrically connected to the digital broadcasting chip, a digital to analog converter and the amplifier, and the first power supply is a rechargeable battery or a storage battery.

16. The wireless playing system as claimed in claim 9, wherein a power supply of the wireless audio frequency playing apparatus is an external type power supply.

17. The wireless playing system as claimed in claim 9, wherein the wireless remote controller is a mobile phone or a mobile Internet device.

\* \* \* \* \*